United States Patent [19]
McLean

[11] Patent Number: 6,065,455
[45] Date of Patent: May 23, 2000

[54] FUEL DELIVERY RE-ROUTING HARNESS

[75] Inventor: Brian McLean, Manchester, Tenn.

[73] Assignee: Allen N. Sharpe, Gulf Breeze, Fla.

[21] Appl. No.: 09/140,884

[22] Filed: Aug. 27, 1998

[51] Int. Cl.[7] .................................................. F02M 31/00
[52] U.S. Cl. ........................................................... 123/557
[58] Field of Search ..................... 123/557, 558, 123/549, 514

[56] References Cited

U.S. PATENT DOCUMENTS

| | | | |
|---|---|---|---|
| 4,022,173 | 5/1977 | Read | 123/122 |
| 4,048,969 | 9/1977 | Widman | 123/133 |
| 4,278,062 | 7/1981 | DeSilva | 123/552 |
| 4,411,239 | 10/1983 | Kelch | 123/557 |
| 4,519,358 | 5/1985 | Redele | 123/557 |
| 4,539,966 | 9/1985 | Guell | 123/557 |
| 4,606,319 | 8/1986 | Silva | 123/525 |
| 4,679,539 | 7/1987 | Storbakken | 123/557 |
| 4,858,584 | 8/1989 | Bridgeman | 123/557 |
| 5,005,551 | 4/1991 | McNelley | 123/557 |
| 5,207,203 | 5/1993 | Wagner et al. | 123/557 |
| 5,219,399 | 6/1993 | Brana | 123/557 |
| 5,411,005 | 5/1995 | Bohl et al. | 123/557 |
| 5,515,814 | 5/1996 | Cooke | 123/3 |
| 5,596,973 | 1/1997 | Grice | 123/557 |

*Primary Examiner*—Marguerite McMahon
*Attorney, Agent, or Firm*—Price & Adams

[57] ABSTRACT

In an internal combustion engine, fuel is delivered from a fuel source through a pressurized fuel line into a first flow conditioner. A return pressure regulator is connected to the pressurized fuel line and bleeds excess fuel pressure back into the fuel source. The first flow conditioner disrupts the flow of the fuel in the fuel line and disperses the fuel molecules. From the first flow conditioner, the fuel travels into a fuel expander which is connected to a source of heat. The fuel is heated in the fuel expander thereby exciting the fuel molecules. From the fuel expander the fuel is directed through a second flow conditioner to further agitate the fuel molecules. A metered amount of fuel is then passed into the internal combustion engine for combustion by the engine. A fuel pressure regulator is connected to the internal combustion engine and maintains a constant fuel pressure in the fuel delivery system. Surplus fuel unused by the engine is passed through the fuel pressure regulator and into a fuel recirculation line. The fuel recirculation line is connected to the pressurized fuel line at a position close to the first flow conditioner to further elevate the temperature of the fuel delivered to the internal combustion engine.

30 Claims, 3 Drawing Sheets

FUEL DELIVERY RE-ROUTING HARNESS

BACKGROUND OF THE INVENTION

1. Field of the Invention

This invention relates generally to a fuel system for an internal combustion engine and more particularly to method and apparatus for expanding the fuel in the fuel system thereby increasing the combustion of the fuel.

2. Description of the Prior Art

It is well known in the art of fuel delivery systems for internal combustion engines that the temperature of fuel delivered to the engine's carburetor or fuel injection system is directly proportional to the efficiency with which the fuel is burned.

As shown in U.S. Pat. No. 4,841,943, fuel which is heated above its ambient temperature tends to vaporize more completely upon introduction into the intake manifold of the engine. The vaporization of the fuel causes the fuel to break down or expand into finely divided fuel molecules each having a surface capable of bonding with oxygen injected with the fuel system. Since it is the oxygen mixed with the fuel which causes the combustion of the fuel, the greater adhesion between fuel molecules and oxygen, the greater the fuel combustion. As fuel combustion increases, the pollutants exhausted by the engine are decreased and the engine runs for a longer duration on a given quantity of fuel. Fuel unused by the vehicle engine is returned to the fuel tank via a fuel return line for recirculation through the delivery system.

U.S. Pat. No. 4,841,943 discloses utilizing engine coolant as a source of heat to increase the temperature of the fuel. The fuel is pumped under pressure from the fuel tank into a heating chamber. A copper coil is present in the chamber and an adjustable quantity of engine coolant is run through the coil to elevate the temperature of the fuel in the heating chamber above its ambient temperature boiling point. The superheated fuel then passes through the chamber and into the fuel injection system of the vehicle.

U.S. Pat. No. 5,596,973 discloses a fuel expanding device in which fuel is directed by the fuel pump from the vehicle fuel tank through a mesh flow conditioning device and into a copper coil. The coil surrounds a portion of the radiator hose and the temperature from the radiator hose elevates the temperature of the fuel passing through the coil. The heated fuel is then passed along to the fuel injection system for combustion by the engine. Additional examples of known fuel heating devices are shown in U.S. Pat. Nos. 3,253,647; 4,434,774; 4,858,584; 4,436,075; 5,443,053; 4,883,040; 5,411,005; 5,005,551; 5,219,399; 4,002,173; 4,048,969; 4,539,966; 4606,319; and 5,515,814.

Although various fuel preheating devices and methods have been constructed and incorporated into internal combustion engines with the intention of increasing fuel combustion, many of these devices have proven to be ineffective mainly due to expense, complexity, and inefficiency. The above-identified devices do not provide a cost effective, simple, and functional method for maximizing fuel temperature prior to introduction into a fuel injection system.

Therefore, there is a need for a fuel expanding device which maximizes the temperature of fuel prior to combustion in the vehicle engine.

SUMMARY OF THE INVENTION

In accordance with the present invention there is provided a fuel delivery system including an internal combustion engine. The internal combustion engine has cylinders wherein fuel is combusted. The fuel delivery system includes a fuel tank for storing fuel. A fuel pump is positioned in said fuel tank for delivering fuel from the fuel tank. A first fuel line connects the fuel tank and a fuel expander for conveying fuel from the fuel tank to the fuel expander. A pressure return assembly is connected to the first fuel line. The pressure return assembly includes a return pressure regulator connected to the first fuel line for regulating the fuel pressure in the pressure return assembly. A fuel return line connects the return pressure regulator and the fuel tank to return surplus fuel from the return pressure regulator to the fuel tank. The fuel expander includes means for elevating the temperature of the fuel to convert the fuel to superheated fuel. Means are provided for metering fuel into the cylinders of the internal combustion engine. A second fuel line connects the fuel expander to the means for metering fuel into the cylinders for conveying the superheated fuel from the fuel expander to the means for metering fuel into the cylinders. A pressure regulator is provided for maintaining a constant fuel pressure in the fuel delivery system. The pressure regulator has an input and an output. The fuel pressure regulator input is connected to the means for metering fuel into the cylinders. A fuel recirculation line is connected to the fuel pressure regulator output for receiving surplus superheated fuel from the fuel pressure regulator. The fuel recirculation line connects the pressure regulator to the first fuel line in a position proximal the fuel expander for conveying the surplus superheated fuel from the pressure regulator to the first fuel line.

Further in accordance with the present invention, there is provided a fuel re-routing harness for delivering fuel from a fuel source to an internal combustion engine including a first pressurized fuel line connected to the fuel source. A pressure return assembly is connected to the first pressurized fuel line for maintaining a constant fuel pressure. A fuel expander has an input connected to the first fuel line. The fuel expander includes means for elevating the temperature of the fuel. The fuel expander has an output connected to a second fuel line. The second fuel line is connected to the internal combustion engine. A fuel pressure regulator having an input and an output is provided for regulating the fuel pressure in the internal combustion engine. The fuel pressure regulator input is connected to the internal combustion engine. A fuel recirculation line is connected to the fuel pressure regulator output for receiving surplus fuel from the fuel pressure regulator. The fuel recirculation line is connected to the first fuel line at a position close to the fuel expander.

Further in accordance with the present invention, there is provided a method for delivering fuel including the steps of pumping fuel from a fuel tank to a fuel expander through a fuel line. A constant fuel pressure is maintained. The temperature of the fuel is elevated from ambient temperature to an elevated temperature in the fuel expander. The fuel is delivered from the fuel expander to a means for metering fuel into an internal combustion engine. The pressure of the fuel is regulated with a fuel pressure regulator. Surplus fuel is delivered from the fuel pressure regulator into the fuel line in a position proximal the fuel expander.

Accordingly, a principal object of the present invention is to provide method and apparatus for maximizing the temperature of fuel prior to introduction into an internal combustion engine.

An additional object of the present invention is to provide a fuel expansion device which conditions the flow of heated fuel both prior to combustion of the fuel in the internal combustion engine.

DESCRIPTION OF THE PREFERRED EMBODIMENTS

Figure 1:
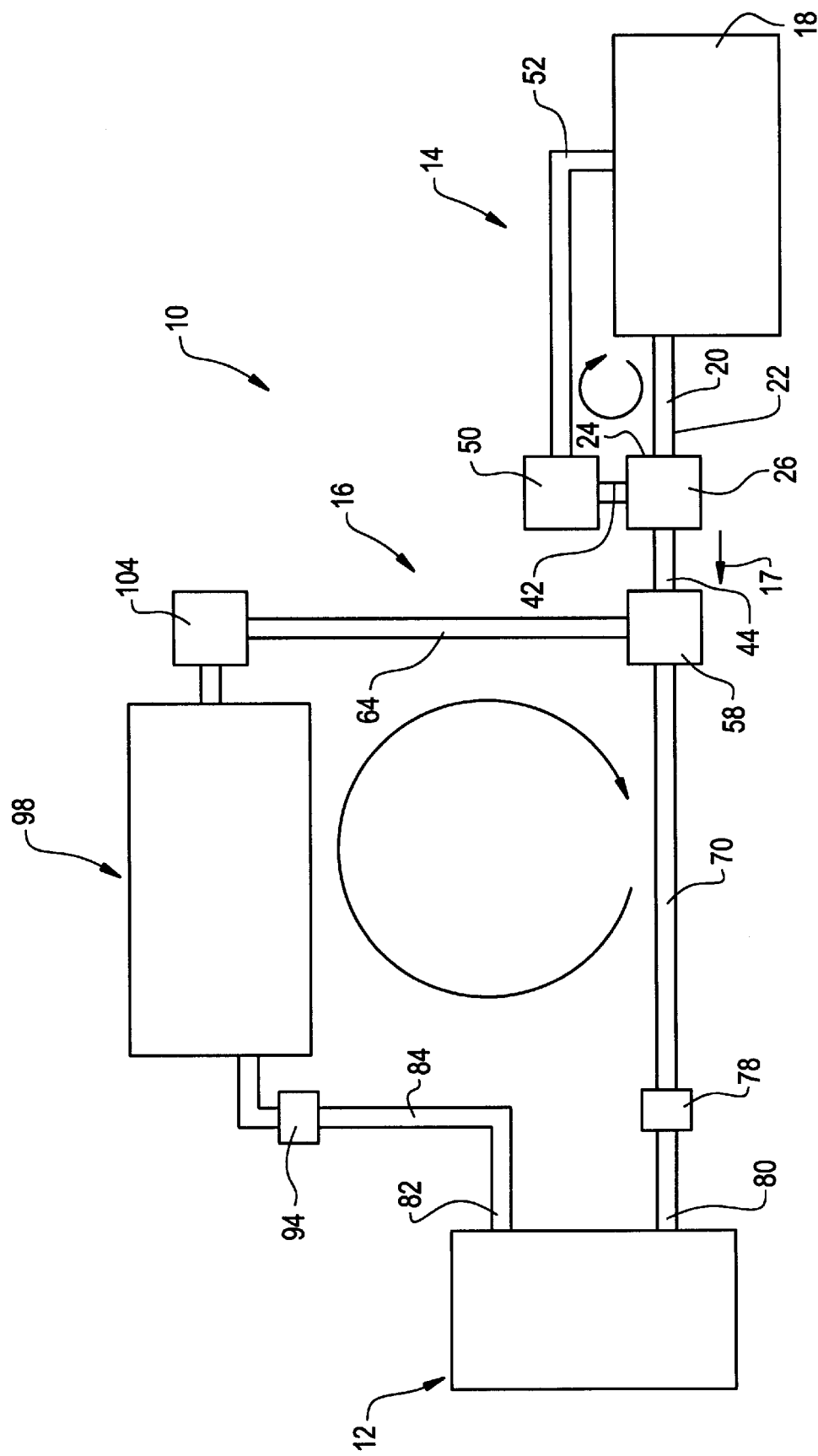
FIG. 1 is a schematic diagram of a fuel delivery system of an internal combustion engine, illustrating a fuel delivery re-routing harness in accordance with the present invention.
Figure 2:
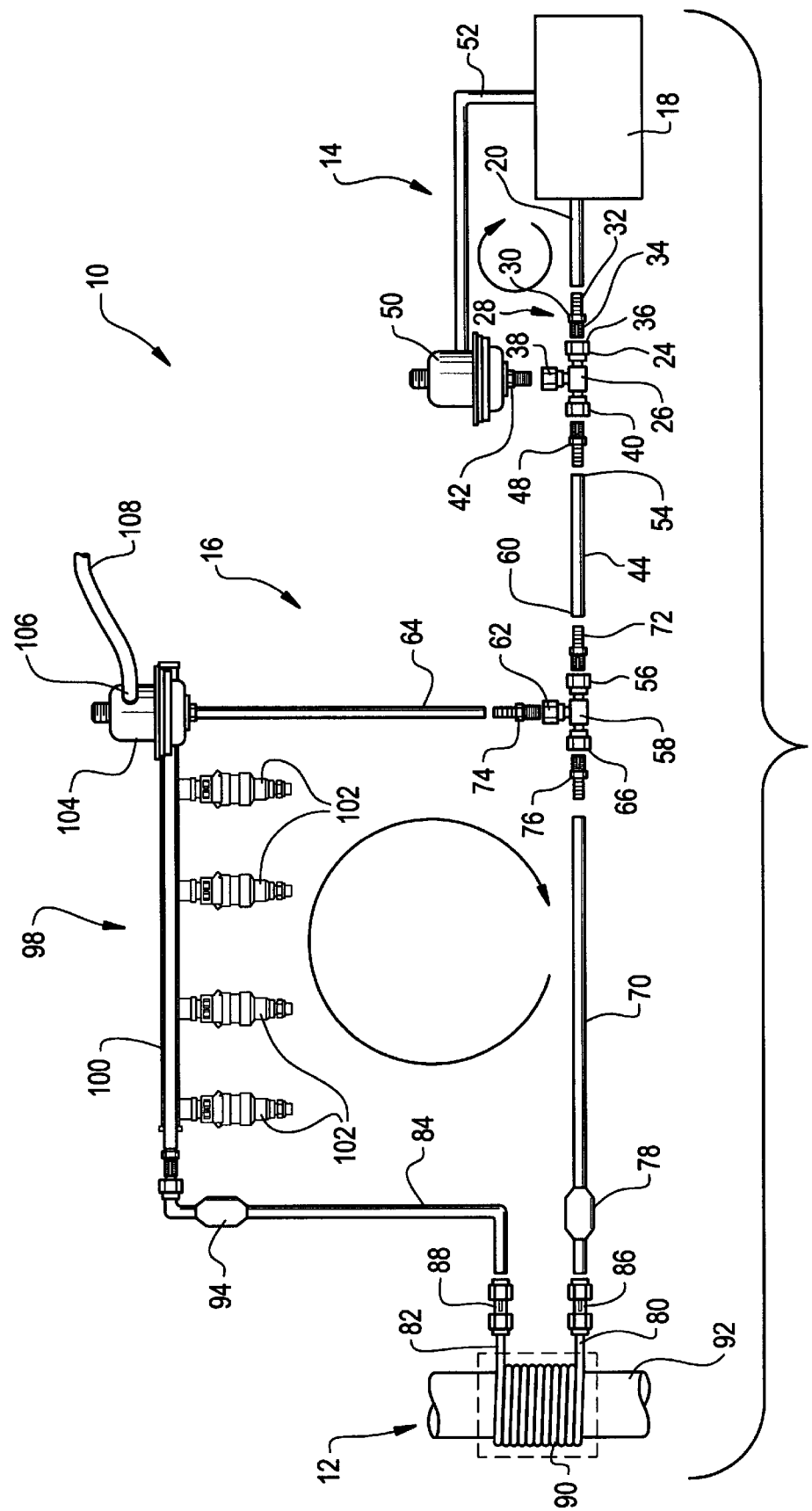
FIG. 2 is an exploded schematic diagram of the fuel delivery system similar to the system shown in FIG. 1.

Referring to the drawings and particularly to FIGS. 1 and 2, there is illustrated a fuel delivery system generally designated by the numeral 10. Fuel delivery system 10 includes a fuel expander generally designated by the numeral 12, a pressure return assembly 14, and a fuel re-routing harness generally designated by the numeral 16.

Fuel is delivered under constant pressure by a fuel pump (not shown) in the direction of arrow 17 from the fuel storage tank 18 of a vehicle through a fuel filter (not shown) to fuel line 20. A downstream end 22 of fuel line 20 is connected to an inlet 24 of a "T" connection 26. As shown in FIG. 2, the fuel line 20 is preferably connected to "T" connection 26 by a connector generally designated by the numeral 28 such as that commonly sold under the trademark Push-Lok. Push-Lok™ connector 28 includes a male input end 30 having a series of barbs 32 thereon to securely engage the downstream end 22 of fuel line 20. The output end 34 of Push-Lok™ connector 28 is threaded for receipt into a correspondingly threaded female input 36 of the "T" connection 26. Outputs 38 and 40 of "T" connection 26 also include threaded female members.

In the preferred embodiment fuel line 20, as well as all other fuel lines disclosed herein, are fabricated of flexible, high pressure, flame resistant, reinforced rubber tubing. However, it should be understood that any suitable type of fuel line may be used such as copper or brass tubing.

Outlet 38 of "T" connection 26 is connected to the threaded input 42 of pressure return assembly 14. The second outlet 40 of "T" connection 26 is connected to fuel line 44. As shown in FIG. 2, fuel line 44 is also preferably connected to "T" connection 26 by Push-Lok™ connectors 48. Push-Lok™ connector 48 is constructed in accordance with the above description.

Pressure return assembly 14 includes threaded input 42 which connects "T" connection output 38 to an adjustable diaphragm fuel pressure regulator 50. The fuel pressure regulator 50 maintains a preselected fuel pressure in the fuel delivery system 10 by permitting fuel pressures above a preselected pressure to bleed through the pressure regulator 50 and return to the fuel storage tank 18 via a fuel return line 52. Preferably, fuel pressure regulator 50 is set to mirror the fuel pressure settings for the fuel pump.

Once operational fuel pressure has been obtained, fuel is delivered under constant pressure through outlet 40 of "T" connection 26 and into the upstream end 54 of fuel line 44. An input end 56 of a second "T" connection 58 is connected to the downstream end 60 of fuel line 44. "T" connection 58 includes a second input 62 for receiving fuel from fuel recirculation line 64 in the fuel re-routing harness 16 and will be discussed in further detail below. "T" connection 58 includes an output 66 which is connected to the upstream end 68 of fuel line 70. As shown in FIG. 2, fuel lines 44 and 64, and 70 are each preferably connected to "T" connection 58 by Push-Lok™ connectors 72, 74, and 76 in the manner described above.

Fuel is delivered through fuel line 70 into a flow conditioner 78. Flow conditioner 78 disrupts the natural flow of the fuel through the fuel line 70 and creates a turbulent effect, thereby dispersing the particles in the fuel and increasing the fuel's expandability.

In the preferred embodiment, flow conditioner 78 includes a mesh member positioned within fuel line 70 and oriented perpendicularly thereto. However, it should be understood that alternative flow conditioning devices include magnets mounted externally of fuel line 70 for generating magnetic fields applied to the fuel to disrupt the flow of the fuel in the fuel line 70.

Fuel travels through the flow conditioner 78 and into the input end 80 of fuel expander 12. Fuel expander 12 is connected to a source of heat in the engine and is designed to impart engine heat upon the fuel flowing through the fuel expander 12 thereby exciting the fuel molecules and forcing them to further separate from each other. After heating by fuel expander 12, the fuel leaves the output end 82 of fuel expander 12 through fuel line 84 and travels toward the vehicle's fuel injection system. As shown in FIG. 2, input end 80 and output end 82 of fuel expander 12 are preferably connected to fuel lines 70 and 84 by compression fittings 86 and 88 such as those commonly sold under the trademark Swage-lok.

As shown in FIG. 2, fuel expander 12 includes a spirally wound tube 90 having a constant diameter. A radiator hose 92 is disposed through the center of the wound tube 90 thereby transferring heat from the engine coolant system to the fuel travelling through the wound tube 90. Although a radiator hose is disclosed as a preferred source of heat, it should be understood that any suitable source of heat may be used in accordance with the present invention. Examples of such alternatives include tubes or pipes for carrying exhaust gases and electrically powered heating means such as resistors.

Figure 3:
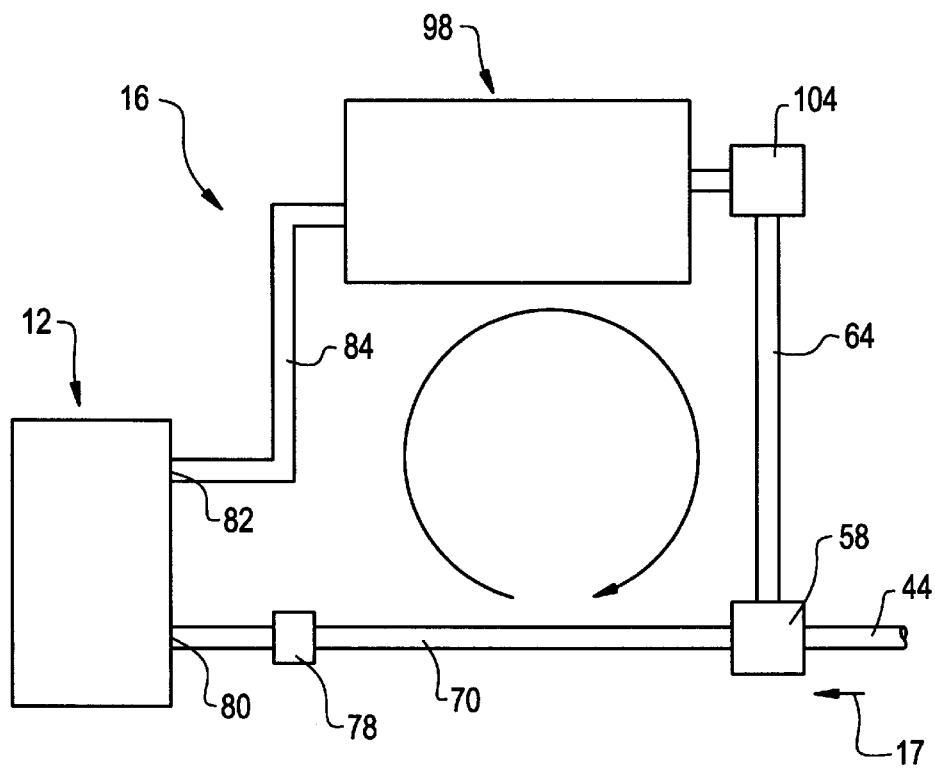
FIG. 3 is a schematic diagram of an alternative embodiment of the fuel re-routing harness shown in FIG. 1.
Figure 4:
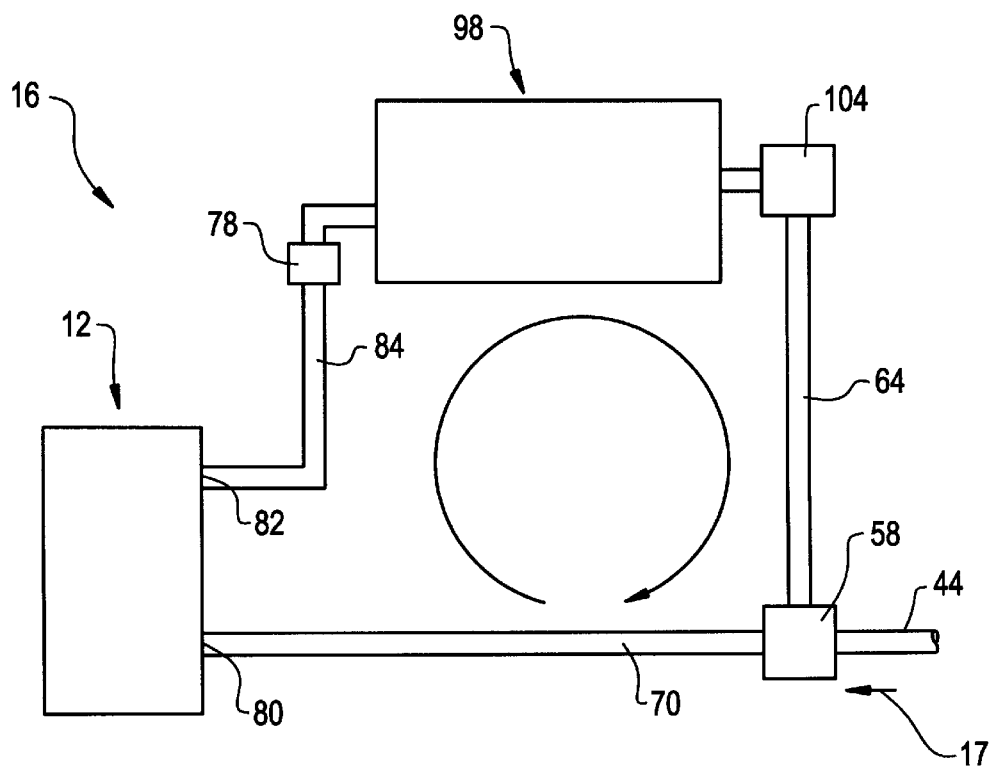
FIG. 4 is a schematic diagram of an additional embodiment of the fuel re-routing harness shown in FIG. 1.

The fuel passes through a second flow conditioner 94 to further agitate the expanded fuel molecules prior to reaching the vehicle's fuel injection system generally designated by the numeral 98. Referring now to FIG. 3, where like numerals designate like elements, there can be seen an alternative embodiment of the present invention in which only a single flow conditioner 78 is used upstream of the fuel expander 12 to disrupt the flow of the fuel and disperse the fuel particles therein. An additional embodiment of the present invention is shown in FIG. 4 in which the single flow conditioner 78 is positioned upstream of the fuel injection system 98 to disrupt the flow of fuel delivered into the vehicle's engine.

The fuel is then delivered through fuel line 84 and into the vehicle's fuel injection system 98. In the preferred embodiment, the fuel injection system 98 includes a fuel rail 100 connected to the fuel line 84. A series of fuel injectors 102 are connected to the fuel rail 100 for spraying a metered amount of fuel into the cylinders of the internal combustion engine. It should be understood that a throttle body injection system may be substituted for the illustrated fuel injection system, wherein fuel and air are mixed by an electronically controlled throttle body and sprayed onto the walls of the engine's intake manifold.

Fuel delivered by fuel delivery system 10 is pumped by the fuel pump at a generally continuous pressure, typically on the order of 12–60 pounds per square inch ("psi"). This pressure is maintained by the fuel pressure regulator 50 which is set to mirror the fuel pressure output of the fuel pump. Since the vehicle engine has varying fuel needs depending upon operating conditions, it is necessary to modify the quantity of fuel delivered by the fuel system 10 to the fuel injection system 98. Typically, the range of fuel pressures delivered to the fuel injection system 98 is between approximately 6 and 50 psi. Therefore, depending upon operating conditions fuel pressure must bypass the fuel injection system 98 in order to maintain the fuel delivery system 10 at a constant overall pressure.

A fuel pressure regulator 104 is connected to the fuel injection system 98 to control the fluctuating amount of fuel applied to the fuel injection system 98. Fuel pressure regulator 104 includes a valve which connects the fuel injection system 98 with the fuel recirculation line 64 through a diaphragm (not shown). Fuel pressure regulator 104 is also connected to a source of vacuum (not shown) created by the vehicle's engine through vacuum inlet 106 and vacuum line 108.

As the vehicle operator engages the throttle there is a corresponding increase in the demand for air in the engine which, in turn, causes negative pressure to be exerted through vacuum line 108 and vacuum inlet 106. The negative pressure causes the diaphragm in fuel pressure regulator 104 to close, thereby reducing the flow between the fuel injection system 98 and fuel recirculation line 64. This correspondingly increases the fuel pressure to the fuel injection system 98. As the throttle is released, the negative pressure exerted through vacuum inlet 106 decreases and the valve enlarges the opening between the fuel injection system 98 and the fuel recirculation line 64.

Traditionally, fuel unused by the engine and passed through to the fuel recirculation line 64 is returned to the fuel tank 18 for reintroduction into the fuel delivery system 10. In accordance with the present invention, surplus heated and conditioned fuel unused by the fuel injection system 98 is passed through the fuel pressure regulator 104 and into fuel recirculation line 64 in the fuel re-routing harness 16. The surplus fuel travels along fuel recirculation line 64 and into the second input 62 of "T" connection 58. From there the surplus heated and conditioned fuel reenters the fuel delivery system adjacent flow conditioner 78 and fuel expander 12.

By re-routing surplus fuel into the fuel delivery system in close proximity to the fuel expander 12, a large portion of the heat previously imparted on the fuel by the fuel expander 12 is retained. This effectively increases the overall temperature of the fuel delivered to the vehicle fuel injection system 98 and correspondingly increases the overall expansion of the fuel for increased combustion by the vehicle engine thereby enhancing engine performance.

According to the provisions of the patent statutes, I have explained the principle, preferred construction, and mode of operation of my invention and have illustrated and described what I now consider to represent its best embodiments. However, it should be understood that, within the scope of the appended claims, the invention may be practiced otherwise than as specifically illustrated and described.

I claim:

1. A fuel delivery system comprising, an internal combustion engine, said internal combustion engine having cylinders wherein fuel is combusted, a fuel tank for storing fuel, a fuel pump positioned in said fuel tank for delivering fuel from said fuel tank, a fuel expander, a first fuel line connecting said fuel tank and said fuel expander for conveying fuel from said fuel tank to said fuel expander, a pressure return assembly connected to said first fuel line, said pressure return assembly includes a return pressure regulator connected to said first fuel line for regulating the fuel pressure in said pressure return assembly, a fuel return line connecting said return pressure regulator and said fuel tank for returning surplus fuel from said return pressure regulator to said fuel tank, said fuel expander including means for elevating the temperature of the fuel to convert the fuel to superheated fuel, means for metering fuel into said cylinders of said internal combustion engine, a second fuel line connecting said fuel expander and said means for metering fuel into said cylinders for conveying the superheated fuel from said fuel expander to said means for metering fuel into said cylinders, a pressure regulator for maintaining a constant fuel pressure in said fuel delivery system, said pressure regulator having an input and an output, said fuel pressure regulator input connected to said means for metering fuel into said cylinders, a fuel re-circulation line connected to said fuel pressure regulator output for receiving surplus superheated fuel from said fuel pressure regulator, and said fuel re-circulation line connecting said pressure regulator to said first fuel line in a position proximal said fuel expander for conveying the surplus superheated fuel from said pressure regulator to said first fuel line.

2. The fuel delivery system set forth in claim 1 which includes at least one flow conditioner therein to agitate the flow of the fuel through said fuel delivery system.

3. The fuel delivery system set forth in claim 2 in which a flow conditioner is positioned in said first fuel line adjacent said fuel expander.

4. The fuel delivery system set forth in claim 2 in which a flow conditioner is positioned in said second fuel line adjacent said means for metering fuel into said cylinders to agitate the superheated fuel.

5. The fuel delivery system set forth in claim 2 including, a first flow conditioner positioned in said first fuel line adjacent said fuel expander, and a second flow conditioner positioned in said second fuel line adjacent said means for metering fuel into said cylinders of said internal combustion engine.

6. The fuel delivery system set forth in claim 2 in which said flow conditioner includes a mesh member for interfering with the flow of fuel and dispersing the fuel particles in the fuel.

7. The fuel delivery system set forth in claim 2 in which said flow conditioner includes means for generating a magnetic field in the fuel for interfering with the flow of fuel and dispersing the fuel particles in the fuel.

8. The fuel delivery system set forth in claim 1 in which said fuel expander comprises, a wound tube having an input and an output, said wound tube input being connected to said first fuel line, said wound tube output being connected to said second fuel line, and said wound tube surrounding a heat source for transferring heat from the heat source to the fuel travelling through said wound tube.

9. The fuel delivery system of claim 8 in which said heat source includes a radiator hose.

10. The fuel delivery system of claim 8 in which said heat source includes an electrical heater.

11. The fuel delivery system of claim 1 in which, said means for metering fuel into said cylinders of said internal combustion engine includes a throttle body injection mechanism, said throttle body injection mechanism includes an intake manifold connected to said cylinders, and said throttle body injection mechanism includes a throttle body for delivering a mixture of fuel and air into said intake manifold.

12. The fuel delivery system of claim 1 in which, said means for metering fuel into said cylinders of said internal combustion engine includes a fuel injection mechanism, said fuel injection mechanism includes a fuel rail having an input and an output, said fuel rail input being connected to said second fuel line, said fuel rail output being connected to said pressure regulator, said fuel injection mechanism includes at least one fuel injector connected to said fuel rail for delivering fuel from the fuel rail to said cylinders of said internal combustion engine.

13. A fuel re-routing harness for delivering fuel from a fuel source to an internal combustion engine comprising, a first pressurized fuel line connected to said fuel source, a pressure return assembly connected to said fuel line for maintaining a constant fuel pressure, a fuel expander having an input connected to said first pressurized fuel line, said fuel expander including means for elevating the temperature of the fuel, said fuel expander having an output connected to a second fuel line, said second fuel line connected to the internal combustion engine, a fuel pressure regulator having an input and an output for regulating the fuel pressure in the internal combustion engine, said fuel pressure regulator input connected to the internal combustion engine, a fuel re-circulation line connected to said fuel pressure regulator output for receiving surplus fuel from said fuel pressure regulator, and said fuel re-circulation line being connected to said first fuel line at a position close to said fuel expander.

14. The fuel re-routing harness set forth in claim 13 which includes at least one flow conditioner therein to interfere with the flow of the fuel to disperse the fuel particles therein.

15. The fuel delivery system set forth in claim 14 in which a flow conditioner is positioned in said first pressurized fuel line adjacent said fuel expander.

16. The fuel delivery system set forth in claim 14 in which a flow conditioner is positioned in said second fuel line adjacent to the internal combustion engine to agitate the superheated fuel.

17. The fuel delivery system set forth in claim 14 including, a first flow conditioner positioned in said first pressurized fuel line adjacent said fuel expander, and a second flow conditioner positioned in said second fuel line adjacent the internal combustion engine.

18. The fuel delivery system set forth in claim 14 in which said flow conditioner includes a mesh member for interfering with the flow of fuel and dispersing the fuel particles in the fuel.

19. The fuel delivery system set forth in claim 14 in which said flow conditioner includes means for generating a magnetic field in the fuel for interfering with the flow of fuel and dispersing the fuel particles in the fuel.

20. The fuel delivery system set forth in claim 13 in which said fuel expander comprises, a wound tube having an input and an output, said wound tube input being connected to said first pressurized fuel line, said wound tube output being connected to said second fuel line, and said wound tube surrounding a heat source for transferring heat from the heat source to the fuel travelling through said wound tube.

21. The fuel delivery system of claim 20 in which said heat source includes a radiator hose.

22. The fuel delivery system of claim 20 in which said heat source includes an electrical heater.

23. The fuel delivery system of claim 13 in which said pressure return assembly includes, a return pressure regulator connected to said fuel pressure line for regulating the fuel pressure in said pressure return assembly, and a fuel return line is connected to said return pressure regulator and said fuel tank for returning surplus fuel from said return pressure regulator to said fuel tank.

24. A method for delivering fuel including the steps of, pumping fuel from a fuel tank to a fuel expander through a pressurized fuel line, maintaining a constant fuel pressure, elevating the temperature of the fuel from ambient temperature to convert the fuel to superheated fuel in the fuel expander, delivering the superheated fuel from the fuel expander to a means for metering fuel into an internal combustion engine, regulating the pressure of the fuel with a fuel pressure regulator, and delivering surplus superheated fuel from the fuel pressure regulator into the fuel line in a position proximal the fuel expander.

25. The method set forth in claim 24 including the step of positioning a flow conditioner in said fuel line upstream of said fuel expander to agitate the fuel and disperse the fuel particles.

26. The method set forth in claim 24 including the step of positioning a flow conditioner downstream of said fuel expander adjacent to the means for metering the fuel into the internal combustion engine to agitate the fuel and disperse the fuel particles.

27. The method set forth in claim 24 including the steps of, positioning a first flow conditioner in said fuel line upstream of said fuel expander, and positioning a second flow conditioner downstream of said fuel expander adjacent the means for metering fuel into the internal combustion engine.

28. The method set forth in claim 24 which includes the steps of, winding a length of tubing around a heat source, connecting an input of the wound tubing to the fuel line, connecting an output of the wound tubing to the means for metering fuel into the internal combustion engine, passing fuel through the wound tubing from the fuel line to the means for metering fuel into the internal combustion engine, and transferring heat from the heat source to the fuel in the wound tube.

29. The method set forth in claim 24 including the step of heating the fuel passing through the heat expander with an electrical heating device.

30. The method set forth in claim 24 including the steps of, connecting a return pressure regulator to the fuel pressure line for regulating the fuel pressure in said pressurized fuel line, and returning surplus fuel from the return pressure regulator to the fuel tank.

* * * * *